(12) United States Patent
Brooks

(10) Patent No.: US 6,523,654 B2
(45) Date of Patent: Feb. 25, 2003

(54) REDUCING INRUSH CURRENT WHEN TRANSFORMER IN ELECTRIC VEHICLE IS CONNECTED TO POWER

(75) Inventor: David Michael Brooks, High Peak (GB)

(73) Assignee: Alstom, Paris (FR)

(*) Notice: Subject to any disclaimer, the term of this patent is extended or adjusted under 35 U.S.C. 154(b) by 0 days.

(21) Appl. No.: 09/883,126

(22) Filed: Jun. 15, 2001

(65) Prior Publication Data

US 2002/0014383 A1 Feb. 7, 2002

(30) Foreign Application Priority Data

Jun. 17, 2000 (GB) .............................................. 0014752

(51) Int. Cl.$^7$ ................................................. B60L 9/00
(52) U.S. Cl. ...................... 191/1 R; 191/45 R; 323/215
(58) Field of Search .............................. 191/2, 22 R, 8, 191/1 R, 45 R; 307/145; 361/35; 323/215, 216; 363/13, 15

(56) References Cited

U.S. PATENT DOCUMENTS

| | | | | |
|---|---|---|---|---|
| 4,175,276 A | * | 11/1979 | Smith | 361/36 |
| 4,730,245 A | * | 3/1988 | Sato | 363/128 |
| 4,900,992 A | * | 2/1990 | Sekizawa et al. | 104/292 |
| 5,566,800 A | * | 10/1996 | Makino et al. | 191/67 |

FOREIGN PATENT DOCUMENTS

| | | |
|---|---|---|
| EP | 0 409 477 A2 | 1/1991 |
| FR | 2 780 548 | 12/1999 |
| GB | 1 600 707 | 10/1981 |
| GB | 2 294 166 A | 4/1996 |
| GB | 2 323 983 A | 10/1998 |

* cited by examiner

*Primary Examiner*—Mark T. Le
(74) *Attorney, Agent, or Firm*—Kirschstein, et al.

(57) ABSTRACT

A method of controlling connection of a transformer of an electric vehicle, such as a train locomotive, to an alternating voltage supply carried by a trolley wire, the object being to reduce the transformer inrush current on connection of the transformer to the supply. Movement of a pantograph of the vehicle is judiciously controlled from its lowered position to a raised position so that as the pantograph approaches the trolley wire an arc bridges the air gap between them to consistently connect the electrical transformer of the vehicle to the trolley wire when the voltage present on the wire is at or near its peak. The vehicle's power system is controlled such that if the power supply to the trolley wire is lost while the pantograph is raised, the transformer is first isolated from the pantograph and then after the power supply is restored, the pantograph is lowered, re-connected to the transformer and re-raised to reestablish the connection with the trolley wire in the above judiciously controlled manner.

13 Claims, 4 Drawing Sheets

REDUCING INRUSH CURRENT WHEN TRANSFORMER IN ELECTRIC VEHICLE IS CONNECTED TO POWER

FIELD OF THE INVENTION

This invention relates to improvements in electric vehicles, such as locomotives for trains, and in particular to a method of reducing the inrush current that occurs when a transformer in such a vehicle is first connected to an alternating current supply. It also relates to a controller that is adapted to control the operation of such an electric vehicle.

BACKGROUND OF THE INVENTION

It is well known to provide electric locomotives for trains with at least one electric motor that drives wheels of the locomotive. In many systems, power for the electric motor or motors is provided by connecting the motors to an overhead wire which runs along the length of the track. The wire is connected to a trackside power source such as a generator and is supported from a catenary. The top of the locomotive is provided with a pantograph mechanism that in use pushes against the wire to provide an electrical connection between the wire (known as a trolley wire) and the electric motor. The motor draws a current from the trolley wire as required.

It has been proposed to supply electric locomotives with an alternating current supply at an alternating voltage through the trolley wire. A transformer is provided on board the locomotive which steps-down the alternating supply from the relatively high voltage needed for transmission along the trolley wire to a lower voltage suitable for supply to the motor and other electrical equipment on the train.

A particular problem occurs with an alternating current scheme when the transformer is initially connected to the trolley wire. For example, this occurs whenever the locomotive is about to start moving or perhaps after a period of constant descent. The transformer can draw a large asymmetrical current when it is initially connected to the trolley wire that can take several seconds to die away each time the transformer is connected to the supply. The DC content of this transient current and its duration can cause a voltage drop in the running rail used for the return of current from the train and this DC current can upset circuitry associated with the track.

The phenomenon of current inrush can better be understood by referring to FIGS. 4(a) and (b) of the accompanying drawings. In FIG. 4(a) the transformer is initially at a state of discharge and is connected to the voltage supply as the voltage crosses a peak. The resulting flux in the transformer changes sinusoidally at quadrature to the voltage. The transformer is usually designed so that the peak flux in this case does not quite saturate the transformer core.

In FIG. 4(b) it is assumed that the voltage supply is connected to the transformer as it crosses through zero volts. In this case, the flux rises rapidly to a peak value far in excess of that required to saturate the transformer. It can then be many cycles before the flux gradually returns to the correct steady state level. It is during this saturation period that a large current is drawn by the transformer.

Much of the signalling equipment on AC railway systems uses DC relay track circuits for train detection. These track circuits are particularly sensitive to transients, but other types of track circuit also tend to be affected. The DC track circuit works by introducing a small DC voltage between the running rails at one end section of a track, and detecting its presence by a relay at the other end. The presence of a train is detected when the wheel-sets short across the rails causing the track circuit to de-energise. Transients at DC present at connection can cause false readings in these safety critical train circuits.

SUMMARY OF THE INVENTION

An object of the present inventions is to ameliorate the problems of inrush current on connection of the transformer of an electrically powered vehicle to an electrical supply.

In accordance with a first aspect, the invention provides a method of controlling connection of a transformer of an electric vehicle to an alternating voltage supply carried by a trolley wire, the vehicle having a contact pad for electrically connecting the transformer to the trolley wire, the contact pad being moveable between a first position in which the contact pad is held away from electrical contact with the trolley wire and a second position in which the contact pad makes electrical contact with the trolley wire, the method comprising the step of judiciously controlling movement of the contact pad towards the trolley wire such that the air gap between the contact pad and trolley wire is broken down to connect the transformer to the trolley wire when the voltage present on the trolley wire is at or near its peak.

By arranging for the transformer to commence conducting at or near the peak voltage, inrush is controlled. This method substantially reduces the maximum level of the magnetizing inrush current and can eliminate the inrush entirely provided that there is no residual flux in the transformer when conduction starts. It is preferred that conduction commences at the exact peak.

As is normal in such electric vehicle power systems, the contact pad is carried on a pantograph and movement of the contact pad is achieved by moving the pantograph between lowered and raised positions.

A switching means is preferably provided between the contact pad and the transformer. The switching means is switchable between a closed state in which current can flow from the contact pad to the transformer and an open state in which the contact pad is isolated from the transformer, the method including the step of ensuring the switching means is closed before moving the contact pad towards the trolley wire. The switching means may be held in the open position when the contact pad is in the first position.

The method may further include the steps of
 measuring the voltage present on the trolley wire when the contact pad is in the second position, and
 if the measured voltage indicates that no supply is present on the trolley wire, re-opening the switching means to isolate the transformer from the trolley wire.

The method may also include the step of re-measuring the voltage on the trolley wire after the switch is re-opened to detect presence of a supply to the trolley wire. This re-measuring may be continuous or performed periodically.

The voltage may be measured directly using a voltage measuring circuit or indirectly, for instance by detecting whether a current is being drawn from the wire by the train.

In the event that a supply is detected while the contact pad is in its second position, the method may include the steps of sequentially moving the contact pad to the first position, closing the switching means and then moving the contact pad back to the second position.

The method may comprise moving the pantograph from the first to the second position of a speed of substantially 0.5 m/s, or less than 0.5 m/s (e.g., 0.3 m/s). Of course, it will be appreciated that the speed needed to cause breakdown at the peak voltage will depend on the voltage used, materials used, size of components, etc., and frequency used.

In accordance with a second aspect the invention provides a power system for an electric vehicle of the kind receiving AC power through a trolley wire, comprising an electric motor, a transformer for supplying power to the electric motor, a contact pad for electrically connecting the transformer to the trolley wire, means for moving the contact pad at a judiciously controlled rate from a first position in which the contact pad is held away from electrical contact with the trolley wire to a second position in which the contact pad makes electrical contact with the trolley wire, an isolating switch switchable between a closed state in which the transformer is connected to the contact pad and an open state in which the transformer is isolated from the contact pad, and control means for executing logical control of the position of the contact pad in conjunction with the state of the switch such that the switch is actuated to the closed state before the contact pad moves from the first position to the second position, whereby the transformer is connected to the supply on the trolley wire as the supply voltage reaches a peak due to the breakdown of the air gap between the trolley wire and the contact pad.

The contact pad is part of a pantograph and the control means is connected to control a pantograph raising/lowering mechanism for moving the contact pad between the first and second positions.

The power system may further comprise a user input device for generating user request signals to the control means thereby to move the contact pad between the first and second positions in response to a user input. The user input signals may be supplied by a driver of the train. One input signal may comprise a "connect" signal upon receipt of which the controller is adapted to connect the transformer to the wire in the aforementioned manner. The other may comprise a disconnect signal upon which the controller is adapted to disconnect the transformer from the wire.

The controller may be adapted to disconnect the transformer from the supply by opening the isolating switch and subsequently lowering the pantograph.

The power system may further comprise sensor means for outputting a signal to the control means indicating the presence or absence of a supply voltage on the trolley wire when the contact pad is in the second position, the control means being adapted to output a signal to open the switch to isolate the transformer from the trolley wire if the sensor means indicates the absence of a supply voltage. The sensor measures the voltage present at a point between the contact pad and the switch.

If the sensor means indicates that a supply voltage is present on the wire when the contact pad is in the second position and the switch is open, the control means is adapted to output signals to sequentially lower the pantograph, close the switch and then move the contact pad back to the second position.

The controller may be adapted to periodically detect the presence of a supply when the pantograph is raised.

According to a third aspect, the invention provides an electric vehicle incorporating a power system in accordance with the second aspect of the invention.

BRIEF DESCRIPTION OF THE DRAWINGS

There will now be described, by way of example only, one embodiment of the present invention with reference to the accompanying drawings of which.

DETAILED DESCRIPTION OF THE PREFERRED EMBODIMENTS

Figure 1:
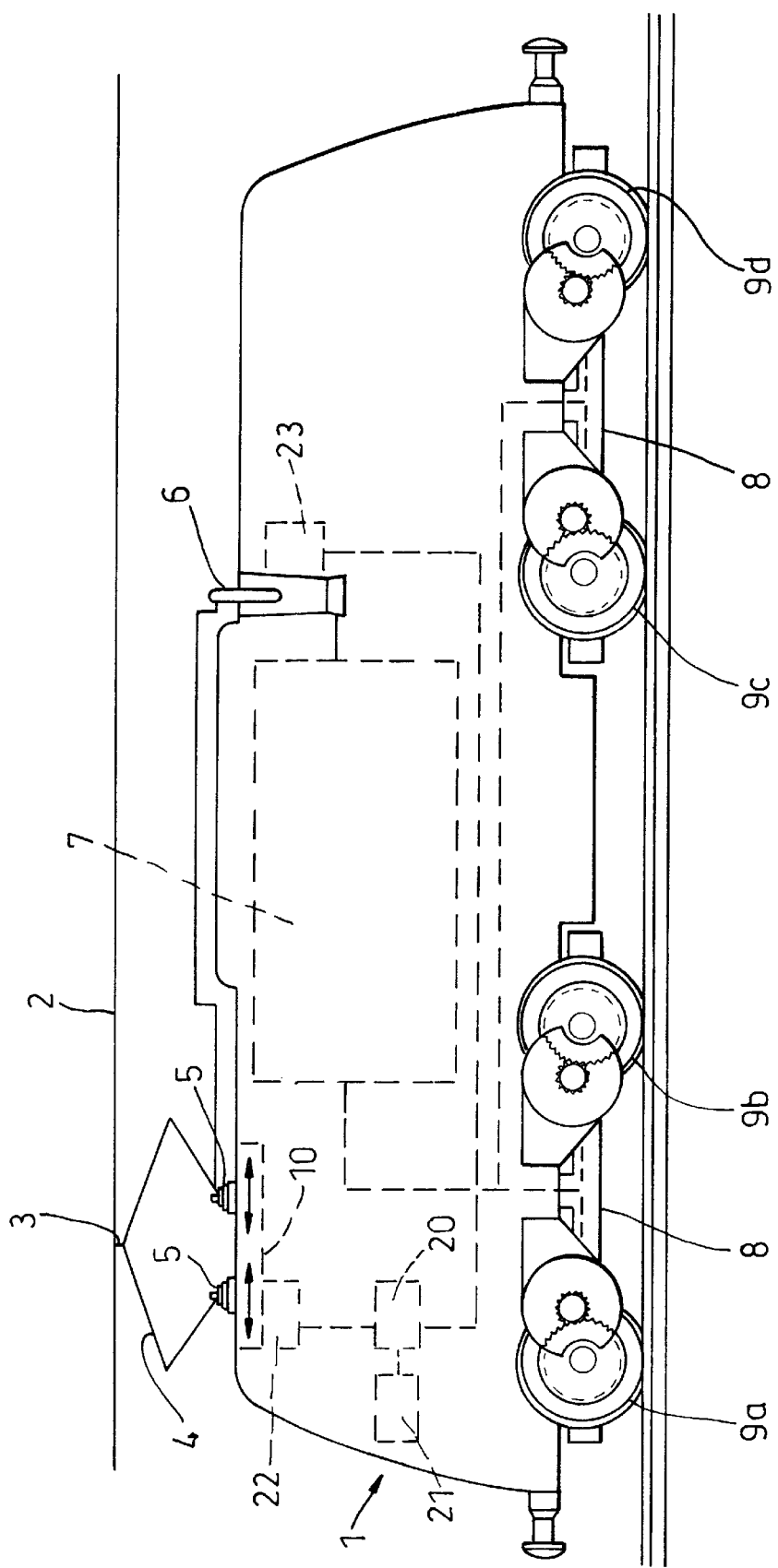
FIG. 1 is an overview of an electric locomotive adapted to be connected to an overhead trolley wire in accordance with the invention.

FIG. 1 is an illustration of an electric locomotive 1 which draws power from an overhead cable known as a trolley wire 2. The wire 2 is supplied with an alternating current waveform at a supply voltage of 25 kVrms and is supported above the rails by a catenary system (not shown).

The locomotive's power system is electrically connected to the trolley wire 2 by means of a pantograph 4 which carries an elongate conductive contact pad 3 that engages the trolley wire 2 when the pantograph is in the raised position as shown in FIG. 1. The pantograph can be lowered to a position in which the pad does not contact the trolley wire. An electrical cable runs down the pantograph from the contact pad 3 to terminals 5 on the roof of the train and a further cable runs from there to a switch 6. The switch is connected to a transformer (shown generally as 7). When the switch is closed an electrical path is provided from the pantograph contact pad 3 to the transformer 7. When the switch is open the path is effectively broken. The switch 6 comprises a fault-make/fault-break type switch. This may be an air blast type switch, as typically provided on older trains, or a vacuum bottle type switch such as designed by Alstom T & D Vacuum Equipment Ltd, Rugby, England.

The output of the transformer is connected electrically to two electric motors 8 which drive the wheels 9a, 9b, 9c and 9d of the train 1.

The pantograph 4 can be raised or lowered to make or break contact with the trolley wire 2 by the simple expedient of, e.g., sliding the terminals 5 towards or away from each other on tracks, movement of the terminals being achieved by a suitable powered mechanism 10 housed in the roof of the locomotive. The switch 6 allows the electricity supply on the trolley wire 2 to be isolated from the transformer 7 even with the pantograph 4 in the raised position.

Figure 2:
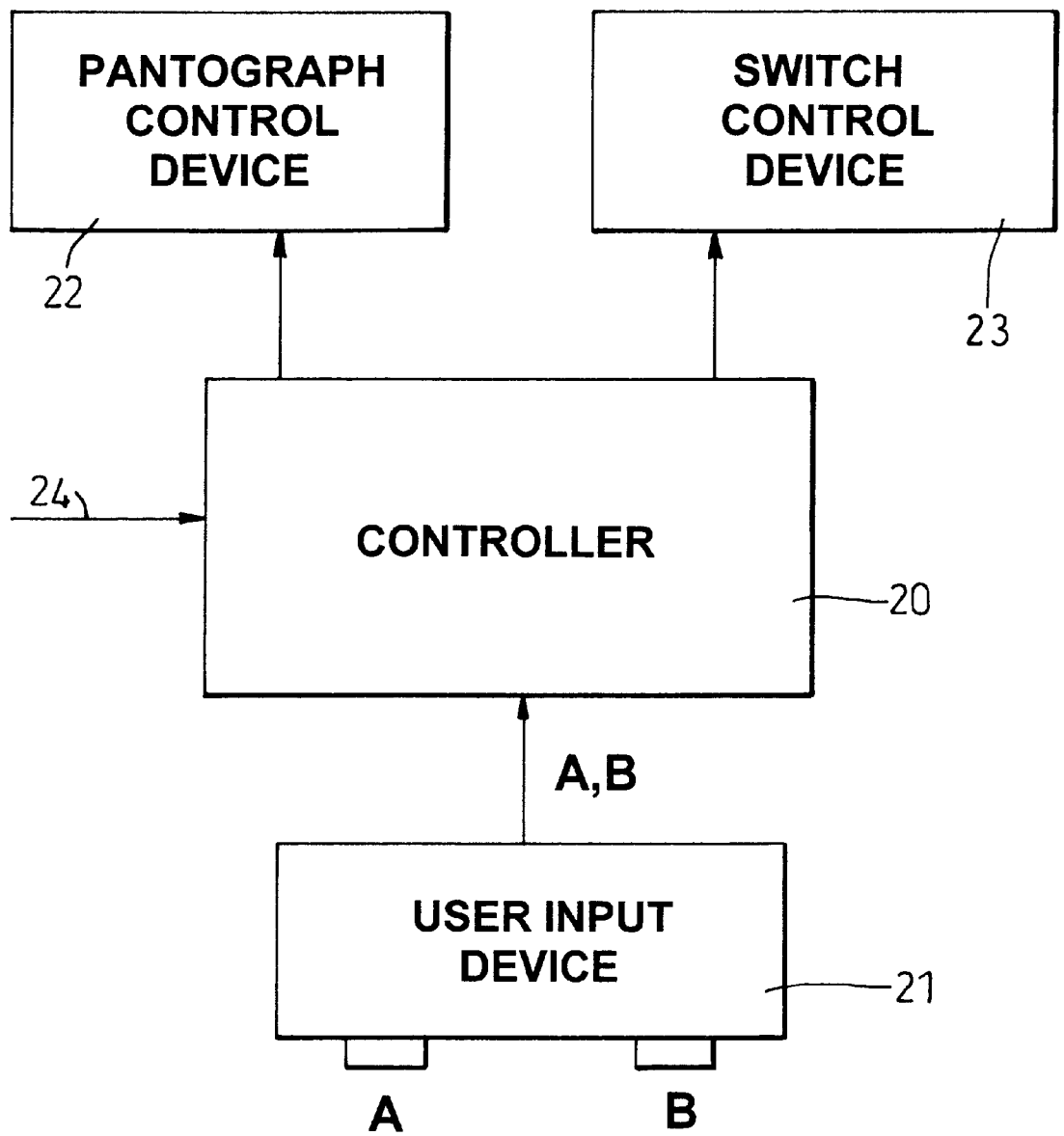
FIG. 2 is a schematic representative of the electrical circuitry which controls connection of the locomotive transformer to the wire.

The operation of the locomotive when changing between its non-powered state (no supply to the transformer 7) and its powered state (transformer 7 drawing power from the trolley wire) is controlled by circuits in the locomotive's power system as illustrated in FIGS. 1 and 2 of the accompanying drawings.

The circuits comprise a controller, generally indicated as 20, which receives input signals from a user request device 21 and issues control signals to a pantograph control device 22 and a switch control device 23.

As best seen in FIG. 2, the user request input device 21 is adapted to provide two input signals to the controller 20. A first signal A comprises a request to connect the transformer 7 to the supply on the trolley wire 2. The second signal B comprises a request to disconnect the transformer 7 from the supply. These user input signals may, for example, be easily produced by means of the user pressing two different switches A or B on the user request device 21.

A voltage sensor (not shown) is also provided which is located on the train to measure the voltage present on the pantograph contact pad 3. The voltage sensor provides a measurement signal 24 to the controller 20.

Figure 3:
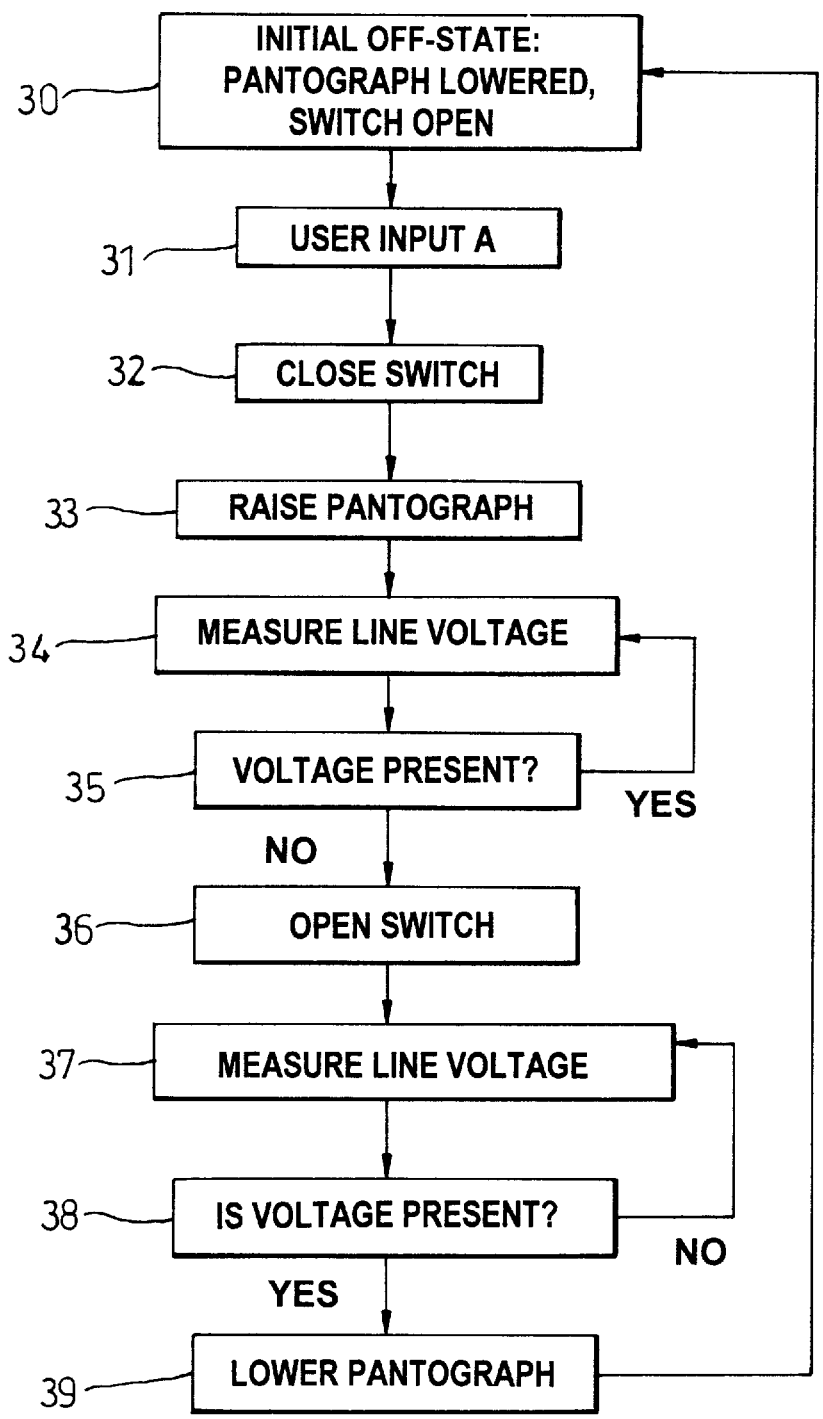
FIG. 3 is a flow diagram showing the sequence of logic steps performed when connecting or disconnecting the locomotive to/from the wire.
Figure 4A:
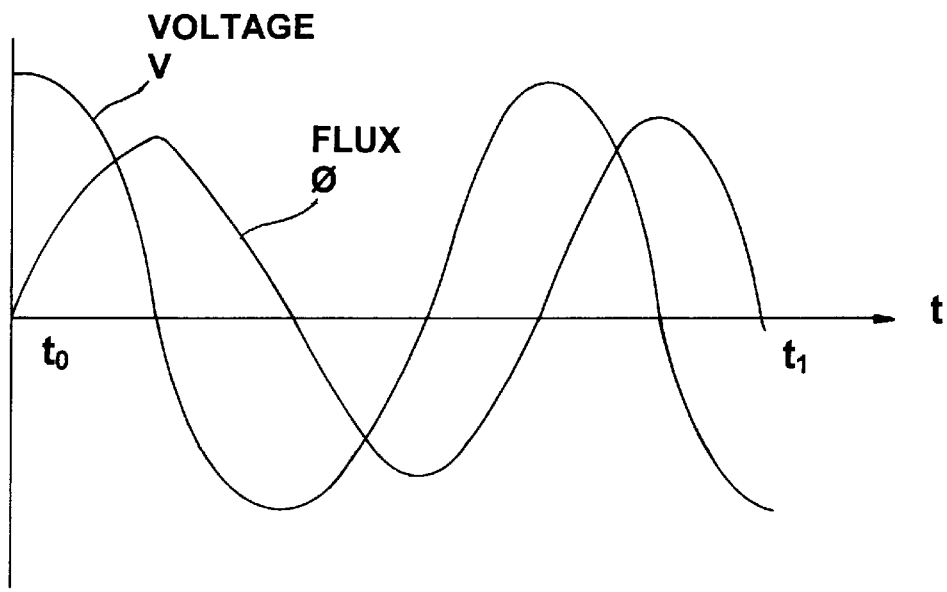
FIGS. 4(a) and 4(b) are illustrations of the change in flux in a transformer after it is connected to a supply at two different points in the supply waveform according to the prior art.
Figure 4B:
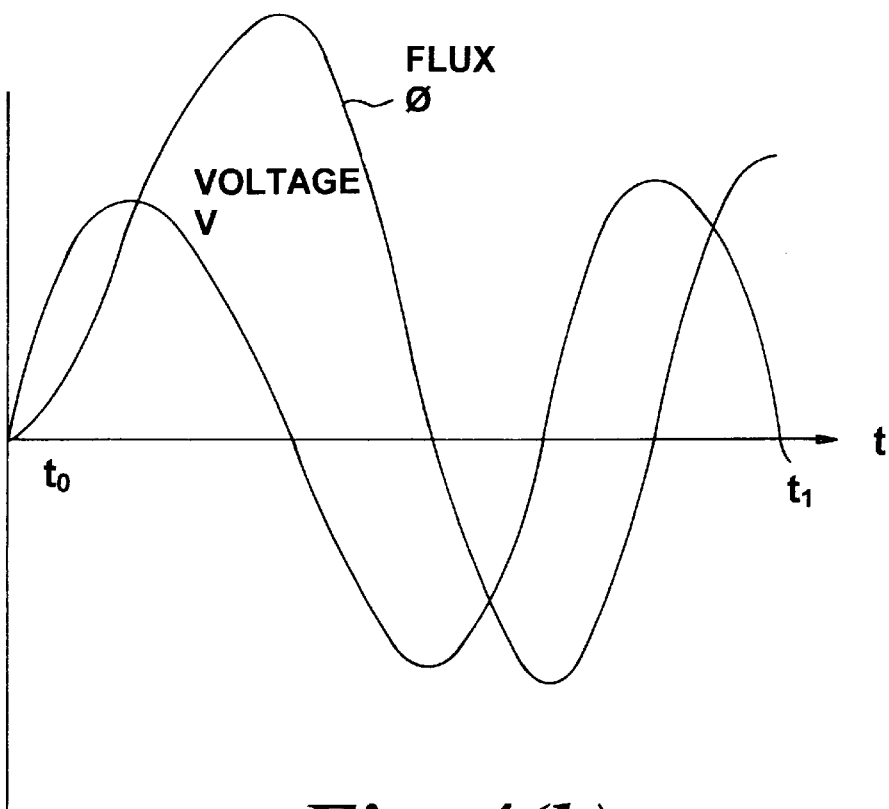

The logic steps performed by the controller 20 are illustrated in the flow chart of FIG. 3 of the accompanying drawings.

Initially, step 30, the pantograph is in its lowered position and the switch 6 is open. This state remains until the controller receives a user input signal A in step 31 for the supply to be connected to the transformer. In the next step 32, the switch 6 is closed so that a continuous electrical path is provided between the contact pad 3 on the pantograph 4 and the transformer 7 and the pantograph 4 is slowly raised, step 33, until the spacing between the contact pad 3 and the trolley wire 2 is sufficiently small for an arc to form between the two. This occurs as the air gap is broken down, and since the voltage on the trolley wire oscillates at a high rate compared to the judiciously controlled rate of movement of the pantograph, the conduction commences at the peak of the voltage on the trolley wire 2. Thus, the supply on the trolley wire is effectively connected to the transformer when the voltage is at its peak (either peak maximum or peak minimum voltage).

On continued movement of the pantograph towards the trolley wire, the contact pad 3 and wire 2 touch, which finishes the arc and continues conduction to the transformer. The pantograph then remains in this position.

As an example of control of pantograph movement which achieves consistently satisfactory working of the invention, a raising speed of 0.5 m/s has been found to produce consistent breakdown of peak voltage over a gap of 50–100 mm using existing overhead wires and pantographs carrying 25 kV supply. However, it will be evident to those skilled in the art that different raising speeds might be necessary for different AC electrical systems, and that simple tests will suffice to determine optimum raising speeds.

After the pantograph touches the trolley wire, in step 34 the controller 20 samples signal 24, which is a measure of the voltage present on the pantograph pad 3. Normally this will indicate, step 35, that a supply is present and that the train is drawing power.

In step 36, if no voltage is present on the trolley wire 2, the controller instructs the switch 6 to open but leaves the pantograph raised.

The voltage on the trolley wire is then monitored, step 37, by the controller either continuously or periodically. Because the voltage sensor is "upstream" of the switch 6 it detects when a supply is connected to the trolley wire 2 even if the switch 6 is open.

In step 38, if a supply is detected with the pantograph raised but the switch open, the pantograph is lowered and the connect sequence restarted from the first step 30, but if no line voltage is detected, the measurement cycle 37,38, merely continues.

If a "disconnect" signal B is received from the user request device 21, any logic sequence proceeding as described in relation to FIG. 3 is overridden, as the controller 20 first opens the switch 6 and then moves the pantograph 4 to its lowered position. The pantograph 4 and switch 6 then remain in that state until such time as the user again makes an input A.

The control logic may be readily and easily embodied using electrical relays or a microprocessor, or a combination of the two. Other arrangements of control logic are also envisaged.

It will be understood that each of the elements described above, or two or more together, also may find a useful application in other types of constructions differing from the types described above.

While the invention has been illustrated and described as embodied in reducing inrush current when transformer in electric vehicle is connected to power, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

I claim:

1. A method of controlling connection of a transformer of an electric vehicle to an alternating voltage supply carried by a trolley wire, the vehicle having a contact pad for electrically connecting the transformer to the trolley wire, the contact pad being moveable between a first position in which the contact pad is held away from electrical contact with the trolley wire and a second position in which the contact pad makes electrical contact with the trolley wire, the method comprising the step of:

controlling movement of the contact pad towards the trolley wire such that an air gap between the contact pad and trolley wire is electrically broken down to connect the transformer to the trolley wire when a voltage present on the trolley wire is at or near its peak.

2. The method according to claim 1, in which the contact pad is carried on a pantograph and movement of the contact pad is achieved by moving the pantograph between lowered and raised positions.

3. The method of claim 1, in which when the contact pad is in the second position, the contact pad partially supports the trolley wire.

4. The method according to claim 1, in which a switching means is provided between the contact pad and a primary winding of the transformer, the switching means being switchable between a closed state in which current can flow from the contact pad to the transformer and an open state in which the contact pad is isolated from the transformer, the method including the step of ensuring the switching means is closed before moving the contact pad towards the trolley wire.

5. The method according to claim 4, which further includes the step of holding the switching means in the open position when the contact pad is in the first position.

6. The method according to claim 5, which further includes the steps of measuring the voltage present on the trolley wire when the contact pad is in the second position, and if the measured voltage indicates that a supply voltage is not present on the trolley wire, re-opening the switching means to isolate the transformer from the trolley wire.

7. The method of claim 6, which includes the further steps of re-measuring the voltage on the trolley wire after the switching means is re-opened to detect presence of the supply to the trolley wire, and if the supply is detected while the contact pad is in its second position, sequentially moving the contact pad to the first position, closing the switching means and then moving the contact pad back to the second position.

8. A power system for an electric vehicle for receiving AC power through a trolley wire, comprising:

an electric motor, a transformer for supplying power to the electric motor, a contact pad for electrically connecting the transformer to the trolley wire, means for moving the contact pad at a controlled rate from a first position in which the contact pad is held away from electrical contact with the trolley wire to a second position in which the contact pad makes electrical contact with the trolley wire, an isolating switch switchable between a closed state in which the transformer is connected to the contact pad and an open state in which the transformer is isolated from the contact pad, and control means for executing logical control of the position of the contact pad in conjunction with the state of the isolating switch such that the switch is actuated to the closed state before the contact pad moves from the first position to the second position, whereby the transformer is connected to a voltage supply on the trolley wire as a supply voltage reaches a peak due to electrical breakdown of an air gap between the trolley wire and the contact pad.

9. The power system according to claim 8, in which the contact pad is part of a pantograph and the control means is connected to control a pantograph raising/lowering mechanism for moving the contact pad between the first and second positions.

10. The power system according to claim 8, further comprising a user input device for generating user request signals to the control means thereby to move the contact pad between the first and second positions in response to a user input.

11. The power system according to claim 9, further comprising sensor means for outputting a signal to the control means indicating the presence or absence of the supply voltage on the trolley wire when the contact pad is in the second position, the control means being adapted to output a signal to open the switch to isolate the transformer from the trolley wire if the sensor means indicates the absence of the supply voltage.

12. The power system according to claim 11, in which if the sensor means indicates that the supply voltage is present on the wire when the contact pad is in the second position and the switch is open, the control means is operative to output signals to sequentially lower the pantograph, close the switch and then move the contact pad back to the second position.

13. An electric vehicle incorporating a power system for receiving AC power through a trolley wire, comprising:

an electric motor, a transformer for supplying power to the electric motor, a contact pad for electrically connecting the transformer to the trolley wire, means for moving the contact pad at a controlled rate from a first position in which the contact pad is held away from electrical contact with the trolley wire to a second position in which the contact pad makes electrical contact with the trolley wire, an isolating switch switchable between a closed state in which the transformer is connected to the contact pad and an open state in which the transformer is isolated from the contact pad, and control means for executing logical control of the position of the contact pad in conjunction with the state of the isolating switch such that the switch is actuated to the closed state before the contact pad moves from the first position to the second position, whereby the transformer is connected to a voltage supply on the trolley wire as a supply voltage reaches a peak due to electrical breakdown of an air gap between the trolley wire and the contact pad.

* * * * *